(12) United States Patent
Moshrefi et al.

(10) Patent No.: US 8,971,863 B2
(45) Date of Patent: Mar. 3, 2015

(54) LOCATION-BASED CALL CENTER FILTERING

(75) Inventors: Afshin Moshrefi, Newburyport, MA (US); Azim Nasir, Foxboro, MA (US); Nader Gharachorloo, Ossining, NY (US); Hong Xiao, Acton, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 569 days.

(21) Appl. No.: 13/355,907

(22) Filed: Jan. 23, 2012

(65) Prior Publication Data
US 2013/0190013 A1 Jul. 25, 2013

(51) Int. Cl.
*H04M 3/42* (2006.01)

(52) U.S. Cl.
USPC ............... 455/414.2; 379/265.11; 379/266.01

(58) Field of Classification Search
USPC ..................... 455/404.1–404.2, 414.1–414.4, 455/456.1–457; 370/142.1, 221.14, 223, 370/265.11–265.14, 266.01–266.09
See application file for complete search history.

(56) References Cited

U.S. PATENT DOCUMENTS

| | | | |
|---|---|---|---|
| 8,554,168 B1 * | 10/2013 | Bonner et al. | 455/404.1 |
| 2007/0041513 A1 * | 2/2007 | Gende | 379/37 |
| 2009/0313077 A1 * | 12/2009 | Wheeler, IV | 705/9 |

\* cited by examiner

*Primary Examiner* — George Eng
*Assistant Examiner* — Marcus Hammonds

(57) ABSTRACT

A device may receive a request for a service call and location information associated with a user device, and may determine an address of a customer, associated with the user device, based on the location information. The device may determine customer information based on the address, and may filter a list of call centers, for the service call, based on the customer information and the address. The device may generate trouble ticket information for the service call, and may provide the customer information and the trouble ticket information to call centers provided in the filtered list of call centers.

21 Claims, 10 Drawing Sheets

LOCATION-BASED CALL CENTER FILTERING

BACKGROUND

A user of a mobile communication device (e.g., a cell phone, a smart phone, etc.) may place a call to a call center of a service provider when the user seeks support for problems associated with services provided by the service provider. The service provider may have numerous call centers and associated telephone numbers for the call centers. The numerous call center telephone numbers may confuse users, such that users may not know which telephone number to call for support. Thus, a significant number of calls to service provider call centers are made to an incorrect call center. For example, a user located in New York City may erroneously place a call to a call center located in Dallas when the call should have been placed to a call center located in New York City. When a call is made to an incorrect call center, a service representative at the incorrect call center must discover the error, determine a correct call center, and transfer the call to the correct call center. Such activities are inconvenient for the user and costly for the service provider.

DETAILED DESCRIPTION OF PREFERRED EMBODIMENTS

Figure 1:
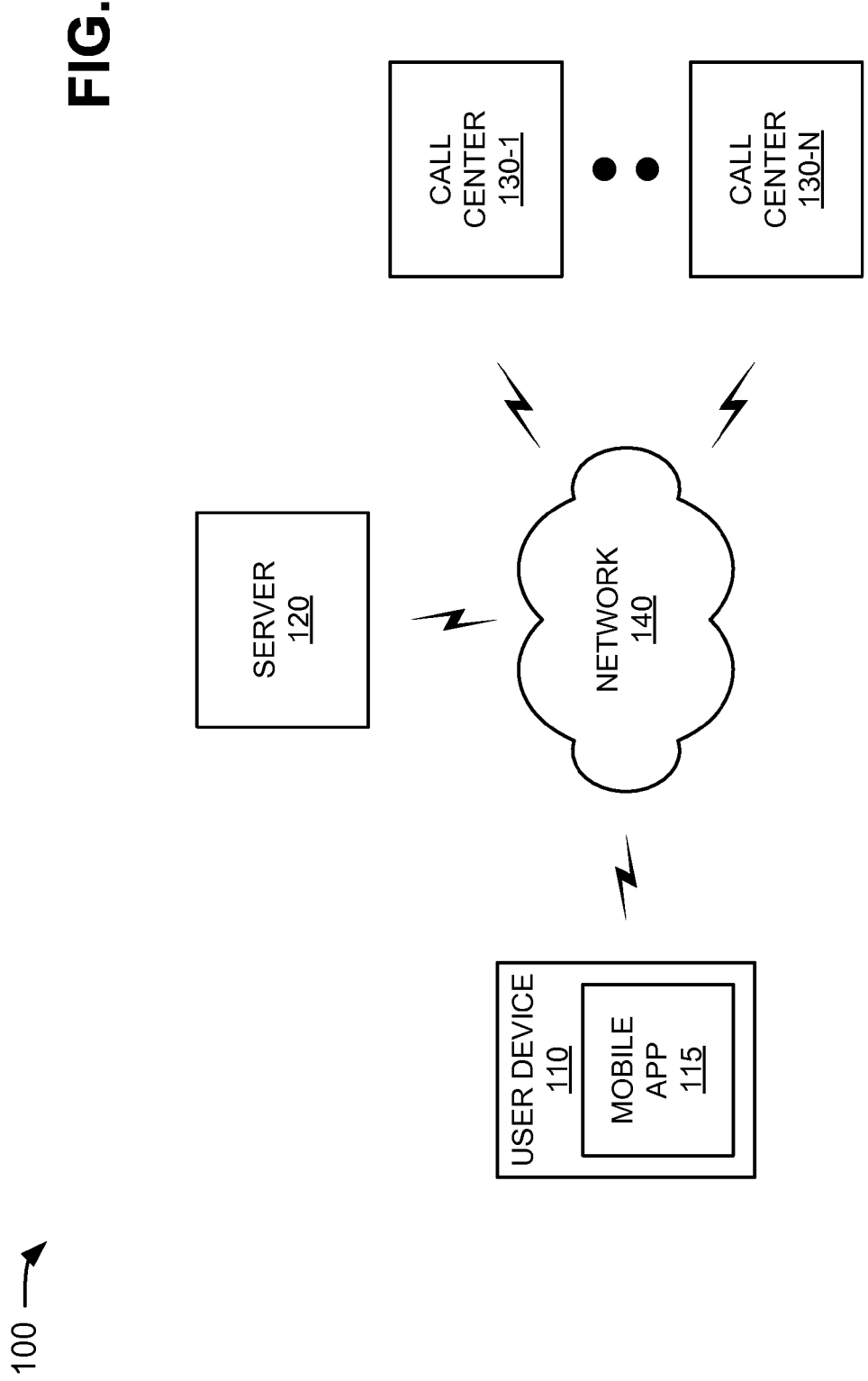
FIG. 1 is a diagram of an example network in which systems and/or methods described herein may be implemented.

The following detailed description refers to the accompanying drawings. The same reference numbers in different drawings may identify the same or similar elements.

Systems and/or methods described herein may enable a user to retrieve, via a user device (e.g., a mobile computation and communication device), a filtered list of call centers for a service call. The systems and/or methods may utilize global positioning system (GPS) coordinates of the user device to determine a location of the user device, and may utilize the location of the user device to identify the user. The systems and/or methods may identify products and/or services subscribed to by the user, and may determine the filtered list of call centers that the user is likely to call based on the location and the products and/or services.

In one example implementation, a server device may receive a service call and location information associated with a user device, and may determine a customer address based on the location information. The server device may determine customer information (e.g., services subscribed to by the customer) based on the customer address, and may filter a list of call centers, for the service call, based on the customer information and the customer address. The server device may generate trouble ticket information for the service call, and may provide the customer information and the trouble ticket information to call centers identified in the filtered list of call centers. The server device may provide the filtered list of call centers to the user device, and the user device may connect to one of the call centers in the filtered list of call centers. Online service information and/or advertisements, tailored to a customer based on the customer information, may also be provided by the server device to the user device.

As used herein, the terms "user" and "customer" are intended to be broadly interpreted to include a user device or a user of a user device.

A "product," as the term is used herein, is to be broadly interpreted to include anything that may be marketed or sold as a commodity or a good. For example, a product may include a mobile computation and communication device, a set-top box (STB), etc.

A "service," as the term is used herein, is to be broadly interpreted to include any act or variety of work done for others (e.g., for compensation). For example, a service may include a repair service (e.g., for a product), a warranty (e.g., for a product), telecommunication services (e.g., telephone services, Internet services, network services, radio services, television services, video services, etc.), etc.

The term "component," as used herein, is intended to be broadly construed to include hardware (e.g., a processor, a microprocessor, an application-specific integrated circuit (ASIC), a field-programmable gate array (FPGA), a chip, a memory device (e.g., a read only memory (ROM), a random access memory (RAM), etc.), etc.) or a combination of hardware and software (e.g., a processor, microprocessor, ASIC, etc. executing software contained in a memory device).

FIG. 1 is a diagram of an example network 100 in which systems and/or methods described herein may be implemented. As illustrated, network 100 may include a user device 110 with a mobile application 115, a server 120, one or more call centers 130-1 through 130-N (collectively referred to herein as "call centers 130," and, in some instances, singularly as "call center 130"), and a network 140. Devices and/or networks of network 100 may interconnect via wired and/or wireless connections. One user device 110, one mobile application 115, one server 120, two call centers 130, and one network 140 have been illustrated in FIG. 1 for simplicity. In practice, there may be more user devices 110, mobile applications 115, servers 120, call centers 130, and/or networks 140.

User device 110 may include a radiotelephone; a personal communications system (PCS) terminal that may combine, for example, a cellular radiotelephone with data processing and data communications capabilities; a smart phone; a personal digital assistant (PDA) that can include a radiotelephone, a pager, Internet/intranet access, etc.; a laptop computer; a tablet computer; or other types of computation and communication devices. In one example, user device 110 may include a mobile computation and communication device that is capable of communicating with server 120 and/or call centers 130 via network 140.

Mobile application 115 may be downloaded to user device 110 from server 120, and may be installed on user device 110. Alternatively, or additionally, mobile application 115 may be provided in server 120, and may be accessed by user device 110 (e.g., via web page). In one example, mobile application 115 may enable a user to retrieve, via user device 110, a filtered list of call centers 130 for a service call. Mobile application 115 may provide GPS coordinates of user device 110 to server 120, and server 120 may utilize the GPS coordinates to determine a location of user device 110. Server 120 may utilize the location of user device 110 to identify the user, and may identify products and/or services subscribed to by the user. Server 120 may determine the filtered list of call centers 130 that the user is likely to call based on the location of the user and the products and/or services, and may provide the filtered list, via mobile application 115, to user device 110. Mobile application 115 may display the filtered list of call centers 130, and may enable the user to select and call (e.g., via a one click mechanism) one of call centers 130 provided in the filtered list. Mobile application 115 may also provide the user with the option of accessing online help for the service call, rather than utilizing a call center, and may display one or more advertisements customized to the user.

Server 120 may include one or more server devices, or other types of computation or communication devices, that gather, process, search, and/or provide information in a manner described herein. In one example implementation, server 120 may receive a service call and location information associated with user device 110, and may determine a customer address based on the location information. Server 120 may determine customer information based on the customer address, and may filter a list of call centers 130, for the service call, based on the customer information and the customer address. Server 120 may generate trouble ticket information for the service call, and may provide the customer information and the trouble ticket information to call centers 130 that are identified in the filtered list. Server 120 may provide the filtered list to user device 110, and user device 110 may connect to one of call centers 130 in the filtered list.

Call center 130 may include one or more computation and communication devices that handle customer service calls from user devices 110. In one example, call centers 130 may be provided in different geographical locations in order to provide better coverage for user devices 110. Call centers 130 may be operated by a service provider in order to provide product and/or service support or to answer information inquiries from customers. In one example, customer service representatives at call center 130 may receive customer service calls, and may address the requests associated with the customer service calls.

Network 140 may include a local area network (LAN), a wide area network (WAN), a metropolitan area network (MAN), a telephone network, such as the Public Switched Telephone Network (PSTN), an intranet, the Internet, an optical fiber (or fiber optic)-based network, a cable television network, a satellite television network, or a combination of networks.

Although FIG. 1 shows example devices/networks of network 100, in other implementations, network 100 may include fewer devices/networks, different devices/networks, differently arranged devices/networks, or additional devices/networks than depicted in FIG. 1. Alternatively, or additionally, one or more devices/networks of network 100 may perform one or more other tasks described as being performed by one or more other devices/networks of network 100.

Figure 2:
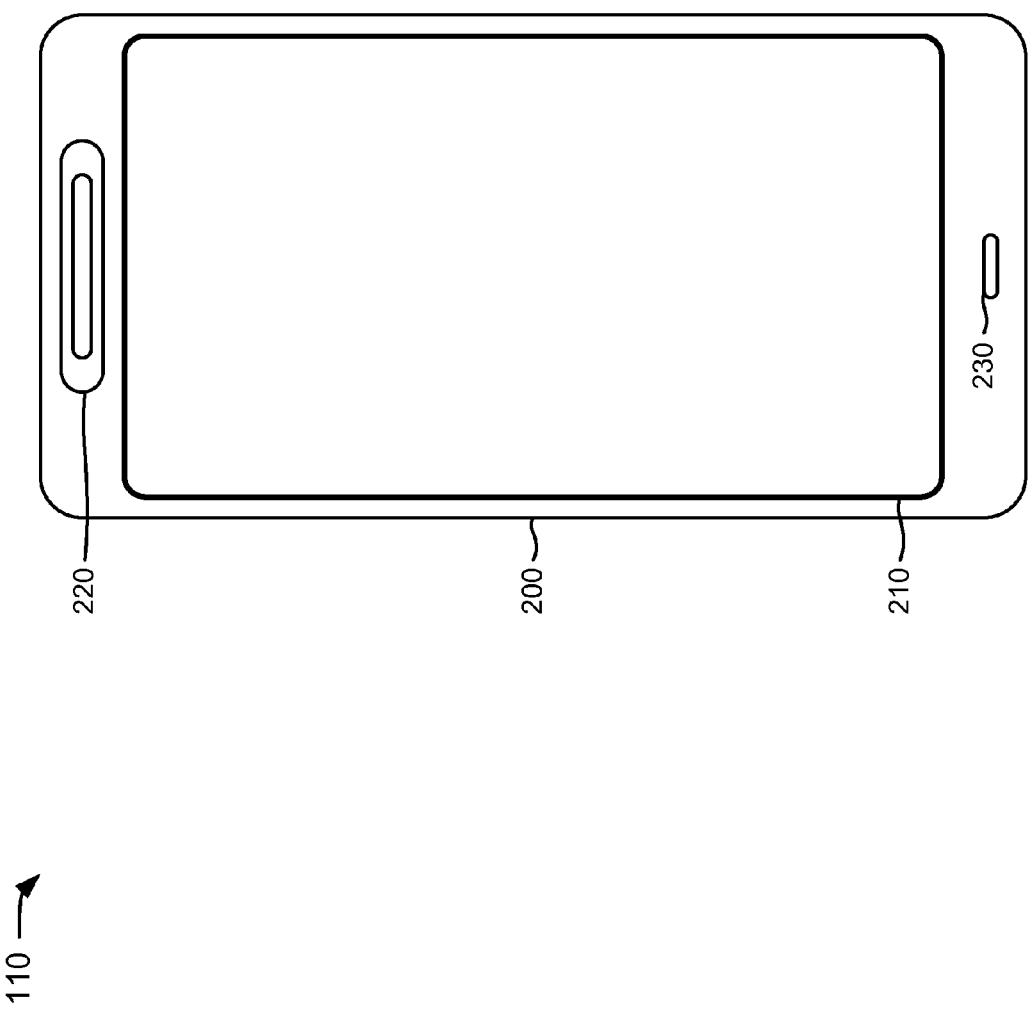
FIG. 2 is a diagram of example external components of a user device of the network depicted in FIG. 1.

FIG. 2 is a diagram of example external components of user device 110. As shown, user device 110 may include a housing 200, a display 210, a speaker 220, and/or a microphone 230.

Housing 200 may protect the components of user device 110 from outside elements. Housing 200 may include a structure configured to hold devices and components used in user device 110, and may be formed from a variety of materials. For example, housing 200 may be formed from plastic, metal, a composite, etc., and may be configured to support display 210, speaker 220, and/or microphone 230.

Display 210 may provide visual information to the user. For example, display 210 may display text input into user device 110, text, images, video, and/or graphics received from another device, and/or information regarding incoming or outgoing calls or text messages, emails, media, games, phone books, address books, the current time, etc. In one implementation, display 210 may include a touch screen display that may be configured to receive a user input when the user touches display 210. For example, the user may provide an input to display 210 directly, such as via the user's finger, or via other input objects, such as a stylus. User inputs received via display 210 may be processed by components and/or devices operating in user device 110. The touch screen display may permit the user to interact with user device 110 in order to cause user device 110 to perform one or more operations.

Speaker 220 may provide audible information to a user of user device 110. Speaker 220 may be located in an upper portion of user device 110, and may function as an ear piece when a user is engaged in a communication session using user device 110. Speaker 220 may also function as an output device for music and/or audio information associated with games and/or video images played on user device 110.

Microphone 230 may receive audible information from the user. Microphone 230 may include a device that converts speech or other acoustic signals into electrical signals for use by user device 110. Microphone 230 may be located proximate to a lower side of user device 110.

Although FIG. 2 shows example components of user device 110, in other implementations, user device 110 may contain fewer components, different components, differently arranged components, or additional components than depicted in FIG. 2. Alternatively, or additionally, one or more components of user device 110 may perform one or more other tasks described as being performed by one or more other components of user device 110.

Figure 3:
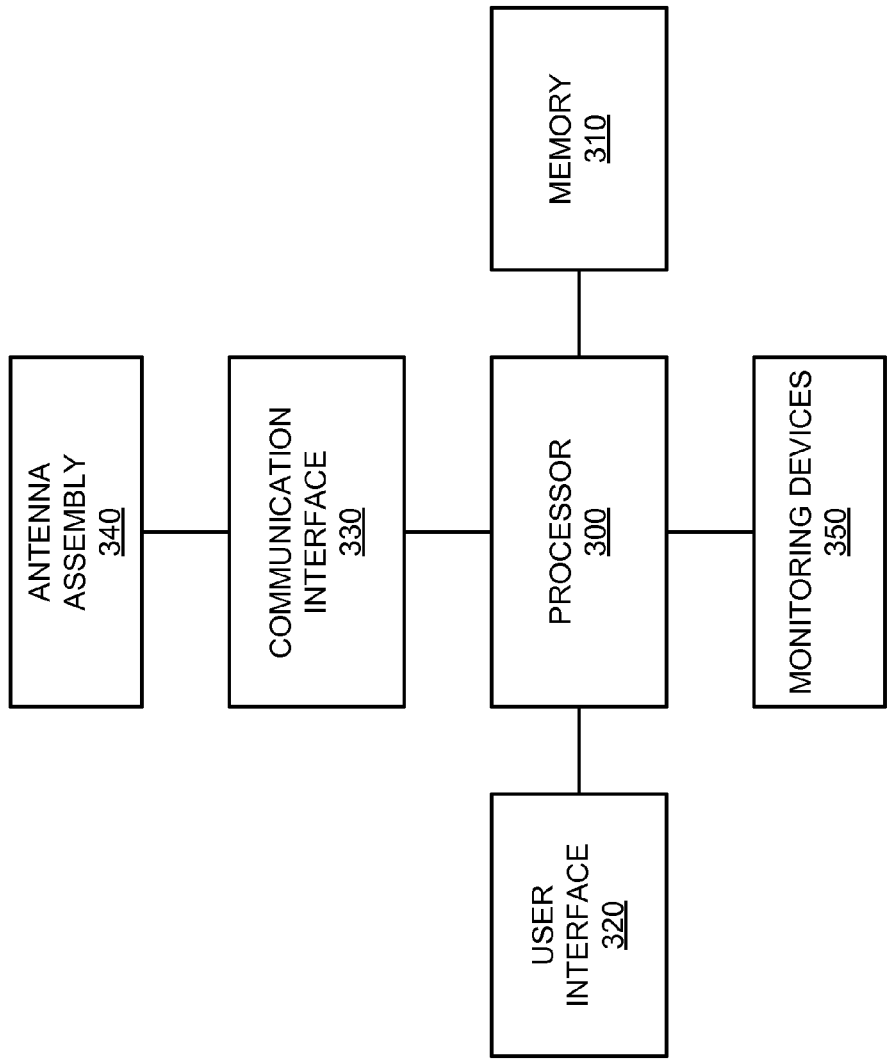
FIG. 3 is a diagram of example internal components of the user device of FIG. 2.

FIG. 3 is an example diagram of internal components of user device 110. As illustrated, user device 110 may include a processor 300, memory 310, a user interface 320, a communication interface 330, and/or an antenna assembly 340.

Processor 300 may include one or more processors or microprocessors that interpret and execute instructions. In other implementations, processor 300 may be implemented as or include one or more ASICs, FPGAs, or the like.

Memory 310 may include a RAM or another type of dynamic storage device that stores information and instructions for execution by processor 300, a ROM or another type of static storage device that stores static information and instructions for processor 300, and/or some other type of magnetic or optical recording medium and its corresponding drive for storing information and/or instructions.

User interface 320 may include mechanisms for inputting information to user device 110 and/or for outputting information from user device 110. Examples of input and output mechanisms might include buttons (e.g., control buttons, keys of a keypad, a joystick, etc.) or a touch screen interface (e.g., display 210) to permit data and control commands to be input into user device 110; a speaker (e.g., speaker 220) to receive electrical signals and output audio signals; a microphone (e.g., microphone 230) to receive audio signals and output electrical signals; a display (e.g., display 210) to output visual information (e.g., text input into user device 110); a vibrator to cause user device 110 to vibrate; etc.

Communication interface 330 may include, for example, a transmitter that may convert baseband signals from processor 300 to radio frequency (RF) signals and/or a receiver that may convert RF signals to baseband signals. Alternatively, communication interface 330 may include a transceiver to perform functions of both a transmitter and a receiver. Communication interface 330 may connect to antenna assembly 340 for transmission and/or reception of the RF signals.

Antenna assembly 340 may include one or more antennas to transmit and/or receive RF signals over the air. Antenna assembly 340 may, for example, receive RF signals from communication interface 330 and transmit them over the air, and receive RF signals over the air and provide them to communication interface 330. In one implementation, for example, communication interface 330 may communicate with a network and/or devices connected to a network.

Each of monitoring devices 350 may include one or more devices that measure movement of user device 110, a location of user device 110, a direction of user device 110, etc. For example, monitoring device 350 may include an accelerometer, a Doppler receiver, a GPS receiver, a gyroscope, a compass, etc. A GPS device may measure the location of user device 110, such latitude and longitude coordinates associated with user device 110. In one example, the GPS device may be used to determine a velocity of user device 110 based on locations of user device 110 over time. For example, user device 110 may be provided at a first location at a first time, and may be provided at a second location at a second time. The distance between the first and second locations and the difference between the first and second times may be used to calculate a velocity of user device 110. An accelerometer, a gyroscope, a compass, etc. may measure an orientation or a direction (e.g., tilted, turned, pointing to the north, south, east, west, etc.) of user device 110.

As described herein, user device 110 may perform certain operations in response to processor 300 executing software instructions contained in a computer-readable medium, such as memory 310. A computer-readable medium may be defined as a non-transitory memory device. A memory device may include space within a single physical memory device or spread across multiple physical memory devices. The software instructions may be read into memory 310 from another computer-readable medium, or from another device via communication interface 330. The software instructions contained in memory 310 may cause processor 300 to perform processes described herein. Alternatively, hardwired circuitry may be used in place of or in combination with software instructions to implement processes described herein. Thus, implementations described herein are not limited to any specific combination of hardware circuitry and software.

Although FIG. 3 shows example components of user device 110, in other implementations, user device 110 may contain fewer components, different components, differently arranged components, or additional components than depicted in FIG. 3. Alternatively, or additionally, one or more components of user device 110 may perform one or more other tasks described as being performed by one or more other components of user device 110.

Figure 4:
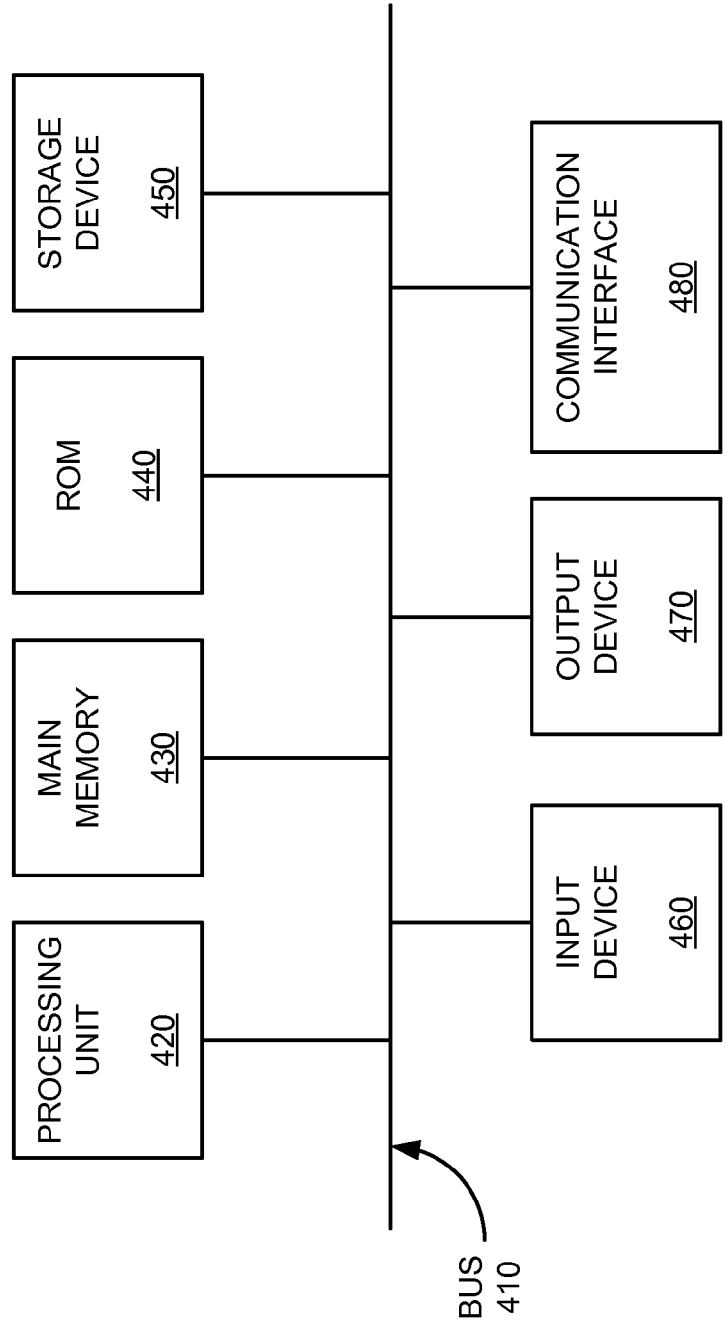
FIG. 4 is a diagram of example components of one or more devices of the network depicted in FIG. 1.

FIG. 4 is a diagram of example components of a device 400 that may correspond to one or more devices of network 100 (FIG. 1). In one example implementation, one or more of the devices of network 100 may include one or more devices 400 or one or more components of device 400. As illustrated, device 400 may include a bus 410, a processing unit 420, a main memory 430, a ROM 440, a storage device 450, an input device 460, an output device 470, and/or a communication interface 480. Bus 410 may include a path that permits communication among the components of device 400.

Processing unit 420 may include one or more processors, microprocessors, or other types of processing units that may interpret and execute instructions. Main memory 430 may include a RAM or another type of dynamic storage device that may store information and instructions for execution by processing unit 420. ROM 440 may include a ROM device or another type of static storage device that may store static information and/or instructions for use by processing unit 420. Storage device 450 may include a magnetic and/or optical recording medium and its corresponding drive.

Input device 460 may include a mechanism that permits an operator to input information to device 400, such as a keyboard, a mouse, a pen, a microphone, voice recognition and/or biometric mechanisms, etc. Output device 470 may include a mechanism that outputs information to the operator, including a display, a printer, a speaker, etc. Communication interface 480 may include any transceiver-like mechanism that enables device 400 to communicate with other devices and/or systems. For example, communication interface 480 may include mechanisms for communicating with another device or system via a network.

As described herein, device 400 may perform certain operations in response to processing unit 420 executing software instructions contained in a computer-readable medium, such as main memory 430. The software instructions may be read into main memory 430 from another computer-readable medium or from another device via communication interface 480. The software instructions contained in main memory 430 may cause processing unit 420 to perform processes described herein. Alternatively, hardwired circuitry may be used in place of or in combination with software instructions to implement processes described herein. Thus, implementations described herein are not limited to any specific combination of hardware circuitry and software.

Although FIG. 4 shows example components of device 400, in other implementations, device 400 may include fewer components, different components, differently arranged components, or additional components than depicted in FIG. 4. Alternatively, or additionally, one or more components of device 400 may perform one or more other tasks described as being performed by one or more other components of device 400.

Figure 5:
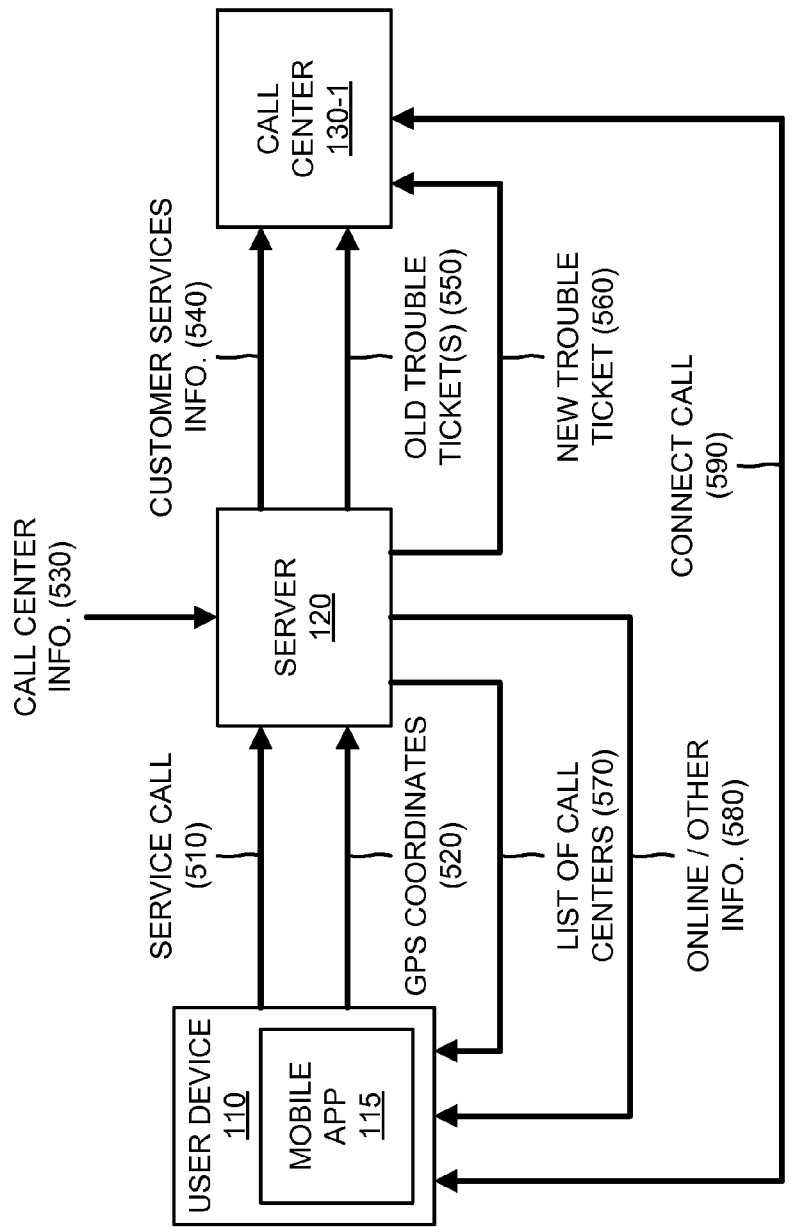
FIG. 5 is a diagram of example operations capable of being performed by an example portion of the network depicted in FIG. 1.

FIG. 5 is a diagram of example operations capable of being performed by an example portion 500 of network 100 (FIG. 1). As shown, network portion 500 may include user device 110, mobile application 115, server 120, and call center 130-1. User device 110, mobile application 115, server 120, and call center 130-1 may include the features described above in connection with, for example, one or more of FIGS. 1-4.

As further shown in FIG. 5, a customer (not shown) of user device 110 may access mobile application 115 via selection of a mechanism (e.g., an icon, a link, a button, a menu item, etc.) associated with mobile application 115. When the customer accesses mobile application 115, mobile application 115 may cause user device 110 to provide a service call 510, or a request for a service, and GPS coordinates 520 (e.g., generated by monitoring device 350, FIG. 3) of user device 110 to server 120. Server 120 may receive service call 510 and GPS coordinates 520. Server 120 may also receive call center information 530 from call centers 130. Call center information 530 may include a list of call centers 130 and their respective telephone numbers; information associated with loads (e.g., utilization rates, call volumes, etc.) provided on call centers 130 during different times of a day; information identifying support issues, use cases, diagnostic results handled by call centers 130; information identifying current loads provided on call centers 130; information identifying priorities (e.g., premium, basic, etc.) associated with different customers; etc.

Server 120 may determine an address associated with the customer based on GPS coordinates 520. The term "address," as used herein, is to be broadly construed to include postal address of a customer, a general geographic location of a customer, and/or other location-based information that enables customer identification. In one example implementation, server 120 may ask the customer (e.g., via mobile application 115) whether service call 510 is for the customer's current location (e.g., as identified by GPS coordinates 520) or another location. If service call 510 is for another location, server 120 may ask the customer (e.g., via mobile application 115) additional questions so that server 120 may determine an address of the other location. Server 120 may identify the customer based on the determined address, and may retrieve customer services information 540 based on the identified customer. Customer services information 540 may include information associated with services and/or products subscribed to by the customer, such as, for example, information associated with a wireless calling plan, a television service plan, an Internet service plan, etc. subscribed to by the customer. Alternatively, or additionally, instead of automatically obtaining the user's location, such as through GPS, the user may manually enter their location as part of the user's interaction with mobile application 115.

Server 120 may filter call center information 530 to obtain a filtered list of call centers 130, for service call 510, based on the determined address and customer services information 540. For example, server 120 may filter call center information 530 to a list of call centers 130 that the customer is likely to call based on the determined address and the services and/or products subscribed to by the customer. If the customer, for example, subscribes to a wireless calling plan for user device 110, server 120 may generate a filtered list of call centers 130 that support wireless calling plans near the determined address. In the example shown in FIG. 5, it may be assumed that call center 130-1 is one of call centers 130 included in the filtered list of call centers 130.

Server 120 may retrieve any outstanding (old) trouble ticket(s) 550 for prior service calls associated with the customer. A "trouble ticket," as the term is used herein, is to be broadly construed to include a mechanism that may be used to track detection, reporting, and resolution of some type of problem (e.g., an outage in the customer's network). Server 120 may also generate a new trouble ticket 560 for service call 510. As further shown in FIG. 5, server 120 may provide customer services information 540, old trouble ticket(s) 550, and new trouble ticket 560 to call centers 130 identified by the filtered list of call centers 130. For example, server 120 may provide customer services information 540, old trouble ticket(s) 550, and new trouble ticket 560 to call center 130-1.

Server 120 may provide a list 570 of call centers 130 and online/other information 580 to user device 110, as further shown in FIG. 5. List 570 may include the filtered list of call centers 130 and the telephones numbers associated with call centers 130 identified in the filtered list. In one example implementation, list 570 may include a ranked list of call centers 130 that may be ranked by server 120 based on the determined address and customer services information 540. User device 110, via mobile application 115, may display the filtered list of call centers 130 to the customer, and may enable the customer to select and call (e.g., via a one click mechanism) one of call centers 130 provided in the filtered list.

Online/other information 580 may include information associated with online help accessible to the customer, information associated with advertisements customized to the customer, etc. User device 110, via mobile application 115, may display an option of accessing online help for service call 510, rather than utilizing a call center 130, and may display one or more advertisements customized to the customer. As further shown in FIG. 5, when the customer selects one of call centers (e.g., call center 130-1) provided in the filtered list, user device 110, via mobile application 115, may automatically connect user device 110 to call center 130-1, as indicated by reference number 590. A representative at call center 130-1 may handle service call 510 directly with the customer.

In one example implementation, server 120 may select an appropriate language for service call 510 based on GPS coordinates 520 and/or the determined location provided by the customer. For example, if GPS coordinates 520 indicate that user device 110 is located in Texas, server 120 may select English as a language for service call 510 and may recommend call centers 130 with English speaking representatives. Alternatively, or additionally, server 120 may route service call 510 to a technician based on a priority associated with the customer. For example, if the customer subscribes to standard services, server 120 may route service call 510 to an available technician that is closest to a location identified by GPS coordinates 520. In another example, if the customer subscribes to premium services, server 120 may route service call 510 to an on call technician that is local to the location identified by GPS coordinates 520. In another example, if the customer subscribes to a highest priority level of services, server 120 may immediately connect service call 510 to a local technician who can respond immediately to service call 510.

Although FIG. 5 shows example components of network portion 500, in other implementations, network portion 500 may include fewer components, different components, differently arranged components, or additional components than depicted in FIG. 5. Additionally, or alternatively, one or more components of network portion 500 may perform one or more other tasks described as being performed by one or more other components of network portion 500.

Figure 6:
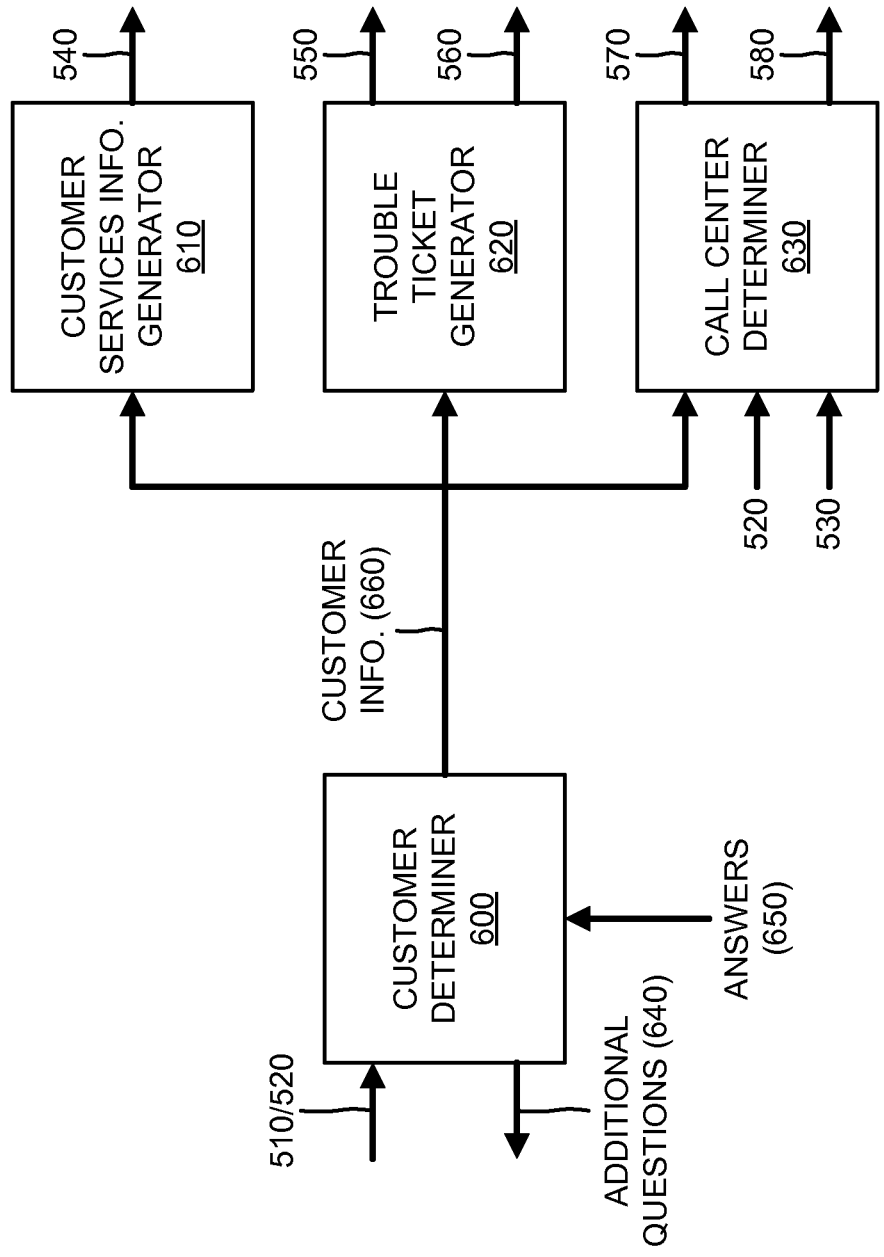
FIG. 6 is a diagram of example functional components of a server of the network in FIG. 1.

FIG. 6 is a diagram of example functional components of server 120. In one implementation, the functions described in connection with FIG. 6 may be performed by one or more components of device 400 (FIG. 4) or by one or more devices 400. As shown in FIG. 6, server 120 may include a customer determiner 600, a customer services information generator 610, a trouble ticket generator 620, and a call center determiner 630.

Customer determiner 600 may receive service call 510 and GPS coordinates 520 from user device 110 (not shown), and may determine an address associated with the customer based on GPS coordinates 520. In one example implementation, customer determiner 600 may ask the customer (e.g., via mobile application 115) whether service call 510 is for the customer's current location (e.g., as identified by GPS coordinates 520) or another location. If service call 510 is for another location, customer determiner 600 may ask the customer (e.g., via mobile application 115) additional questions 640 about the other location, and may receive answers 650 to additional questions 640. Customer determiner 600 may determine an address of the other location based on answers 650. Customer determiner 600 may identify the customer based on the determined address, and may provide customer information 660, based on the identified customer, to customer services information generator 610, trouble ticket generator 620, and call center determiner 630. Customer information 660 may include a name, an address, a telephone number, account information, etc. associated with the customer.

Customer services information generator 610 may receive customer information 660 from customer determiner 600, and may generate customer services information 540 based on customer information 660. In one example, customer services information generator 610 may retrieve customer services information 540 from a database (e.g., associated with server 120) that includes services information associated with customers of a service provider that owns and/or operates server 120 and call centers 130. Customer services information generator 610 may provide customer services information 540 to one of call centers 130 (not shown).

Trouble ticket generator 620 may receive customer information 660 from customer determiner 600, and may retrieve any old trouble ticket(s) 550 for prior service calls associated with the customer. Trouble ticket generator 620 may also generate new trouble ticket 560 for service call 510. Trouble ticket generator 620 may provide old trouble ticket(s) 550 and/or new trouble ticket 560 to one of call centers 130 (not shown).

Call center determiner 630 may receive customer information 660 from customer determiner 600, and may receive GPS coordinates 520 and call center information 530. Call center determiner 630 may filter call center information 530 to obtain a filtered list of call centers 130, for service call 510, based on GPS coordinates 520, call center information 530, and/or customer information 660. Call center determiner 630 may determine online/other information 580 based on customer information 660. Call center determiner 630 may provide list 570 of call centers 130 and online/other information 580 to user device 110 (not shown). Further details of call center determiner 630 are provided below in connection with FIG. 7.

Although FIG. 6 shows example functional components of server 120, in other implementations, server 120 may include fewer functional components, different functional components, differently arranged functional components, or additional functional components than depicted in FIG. 6. Additionally, or alternatively, one or more functional components of server 120 may perform one or more other tasks described as being performed by one or more other functional components of server 120.

Figure 7:
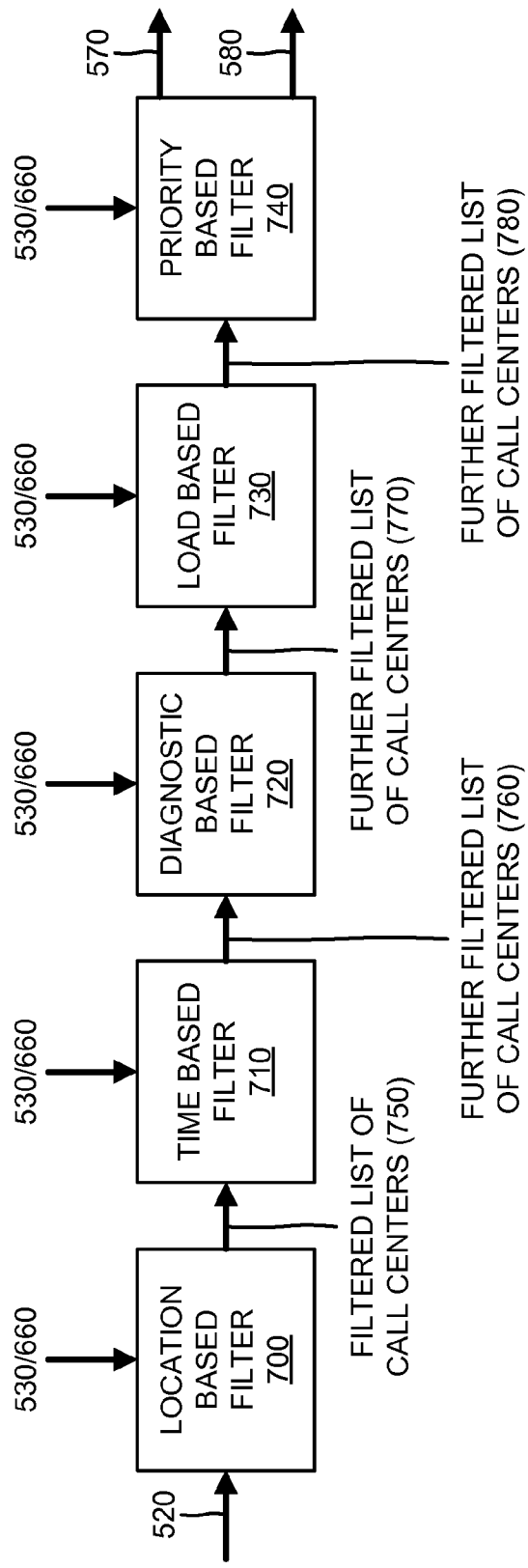
FIG. 7 is a diagram of example functional components of a call center determiner depicted in FIG. 6.

FIG. 7 is a diagram of example functional components of call center determiner 630. In one implementation, the functions described in connection with FIG. 7 may be performed by one or more components of device 400 (FIG. 4) or by one or more devices 400. As shown in FIG. 7, call center determiner 630 may include a location based filter 700, a time based filter 710, a diagnostic based filter 720, a load based filter 730, and a priority based filter 740.

Location based filter 700 may receive GPS coordinates 520, call center information 530, and customer information 660. Location based filter 700 may filter call center information 530 to obtain a filtered list 750 of call centers 130, for service call 510, based on GPS coordinates 520, call center information 530, and/or customer information 660. For example, location based filter 700 may filter call center information 530 to filtered list 750 of call centers 130 that the customer is likely to call based on the determined address and the services and/or products subscribed to by the customer. As further shown in FIG. 7, location based filter 700 may provide filtered list 750 of call centers 130 to time based filter 710.

Time based filter 710 may receive filtered list 750 of call centers 130 from location based filter 700, and may receive call center information 530 and customer information 660. Time based filter 710 may further filter list 750 of call centers 130, to create a further filtered list 760, based on a time of day associated with service call 510, call center information 530, and/or customer information 660. For example, time based filter 710 may create further filtered list 760 of call centers 130 based on information associated with loads (e.g., utilization rates, call volumes, etc.) provided on call centers 130 during different times of a day. If service call 510 is received at a particular time and certain call centers 130 are less loaded at the particular time, time based filter 710 may include the certain call centers 130 in further filtered list 760. Time based filter 710 may provide further filtered list 760 to diagnostic based filter 720.

Diagnostic based filter 720 may receive further filtered list 760 of call centers 130 from time based filter 710, and may receive call center information 530 and customer information 660. Diagnostic based filter 720 may further filter list 760 of call centers 130, to create a further filtered list 770, based on diagnostic results associated with service call 510, call center information 530, and/or customer information 660. For example, diagnostic based filter 720 may create further filtered list 770 by performing diagnostics on service issues previously encountered by the customer and by identifying call centers 130 based on the diagnostic results. Diagnostic based filter 720 may provide further filtered list 770 to load based filter 730.

Load based filter 730 may receive further filtered list 770 of call centers 130 from diagnostic based filter 720, and may receive call center information 530 and customer information 660. Load based filter 730 may further filter list 770 of call centers 130, to create a further filtered list 780, based on loads associated with call centers 130, call center information 530, and/or customer information 660. For example, load based filter 730 may create further filtered list 780 by identifying call centers 130 with the least loads and by including the identified calls centers 130 in further filtered list 780. Identification of call centers 130 with the least loads may reduce the customer's waiting time and may improve customer experience. Load based filter 730 may provide further filtered list 780 to priority based filter 740.

Priority based filter 740 may receive further filtered list 780 of call centers 130 from load based filter 730, and may receive call center information 530 and customer information 660. Priority based filter 740 may further filter list 780 of call centers 130, to create list 570, based on a priority (e.g., standard account, premium account, etc.) associated with the customer, call center information 530, and/or customer information 660. For example, priority based filter 740 may create list 570 by identifying call centers 130 based on the priority associated with the customer and by including the identified calls centers 130 in list 570. Priority based filter 740 also may determine online/other information 580 based on customer information 660. Priority based filter 740 may provide list 570 and online/other information 580 to user device 110 (not shown).

Although FIG. 7 shows example functional components of call center determiner 630, in other implementations, call center determiner 630 may include fewer functional components, different functional components, differently arranged functional components, or additional functional components than depicted in FIG. 7. Additionally, or alternatively, one or more functional components of call center determiner 630 may perform one or more other tasks described as being performed by one or more other functional components of call center determiner 630.

Figure 8:
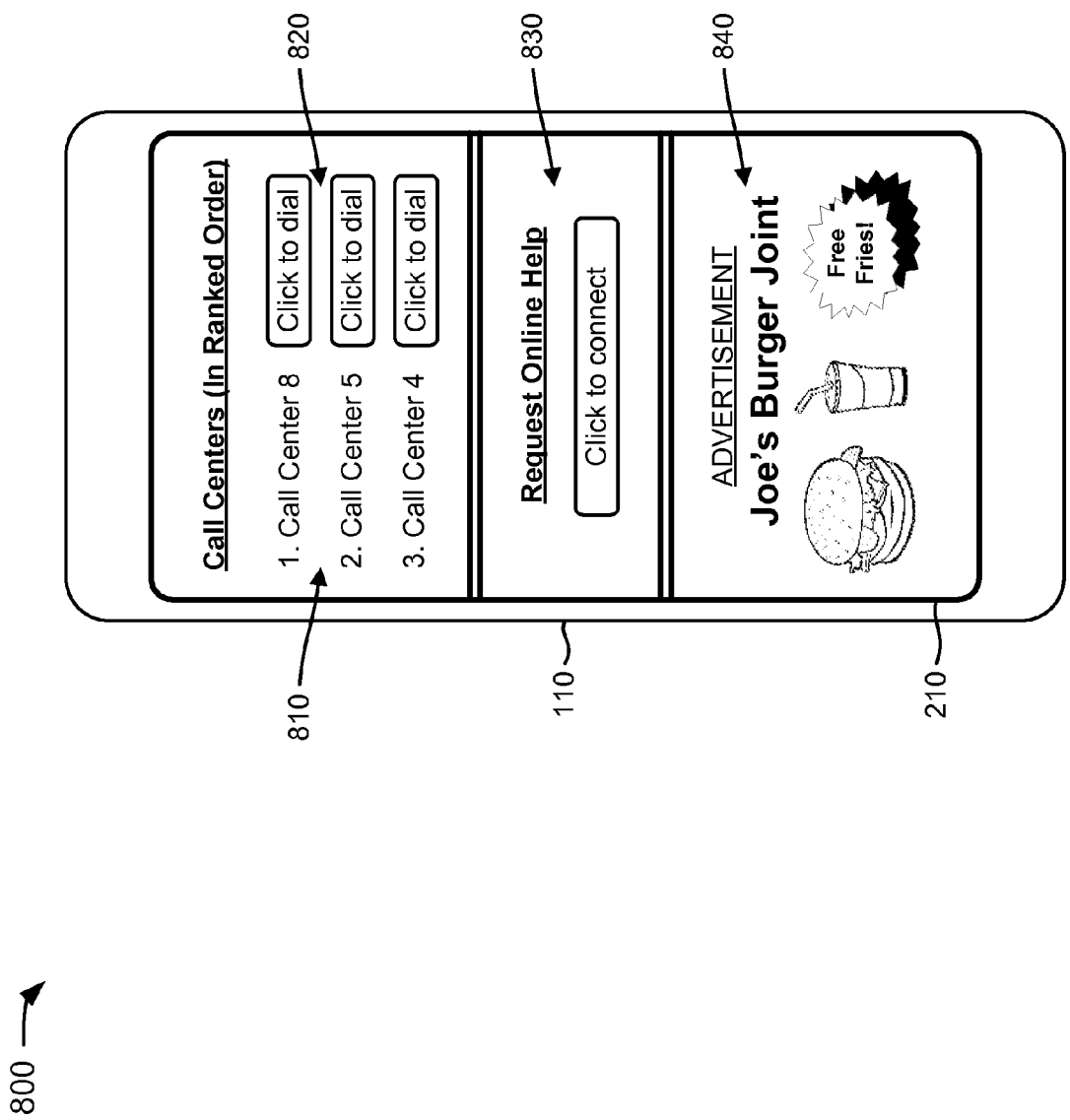
FIG. 8 is a diagram of an example user interface that may be generated or provided by a user device of the network depicted in FIG. 1.

FIG. 8 is a diagram of an example user interface 800 that may be generated or provided by user device 110. User interface 800 may include a graphical user interface (GUI) or a non-graphical user interface, such as a text-based interface. User interface 800 may provide information to users via a customized interface (e.g., a proprietary interface) and/or other types of interfaces (e.g., a browser-based interface, etc.). User interface 800 may receive user inputs via one or more input devices (e.g., display 210, FIG. 2), may be user-configurable (e.g., a user may change the size of user interface 800, information displayed in user interface 800, color schemes used by user interface 800, positions of text, images, icons, windows, etc., in user interface 800, etc.), and/or may not be user-configurable. Information associated with user interface 800 may be selected and/or manipulated by a user of user device 110 (e.g., via a touch screen display, a mouse, a keyboard, a keypad, voice commands, etc.).

Although not shown in FIG. 8, display 210 of user device 110 may display a selection mechanism (e.g., an icon, a link, a button, etc.) associated with mobile application 115. If the customer selects the selection mechanism, mobile application 115 may cause user device 110 to provide service call 510 and GPS coordinates 520 to server 120, as described above in connection with FIG. 5. In response to service call 510 and GPS coordinates 520, server 120 may provide list 570 of call centers 130 and online/other information 580 to user device 110.

Mobile application 115 may cause user device 110 to display, via user interface 800, information associated with list 570 of call centers 130 and with online/other information 580. For example, as shown in FIG. 8, user interface 800 may display list 570 as a ranked list 810 of call centers 130 that the customer may utilize for service call 510. Ranked list 810 may indicate that "Call Center 8" is a first call center 130 that the customer should utilize, that "Call Center 5" is a second call center 130 that the customer should utilize, and that "Call Center 4" is a third call center 130 that the customer should utilize. As further shown, user interface 800 may display selection mechanisms 820 (e.g., click to dial buttons, icons, etc.) that the customer may select to automatically call one of call centers 130 provided in ranked list 810.

User interface 800 may also display an online help section 830 that may enable the customer to utilize online services (e.g., Internet based services) to address the issue associated with service call 510. The online services may be used instead of or in addition to contacting one of call centers 130 provided in ranked list 810. Online help section 830 may include a selection mechanism (e.g., an icon, a button, a link, etc.) that the customer may select in order automatically access the online services.

As further shown in FIG. 8, user interface 800 may display an advertisement 840 that may be customized for the customer based on a location of user device 110 (e.g., obtained via GPS coordinates 520) and/or based on customer information 660. For example, if GPS coordinates 520 indicate that user device 110 is located near Joe's Burger Joint, advertisement 840 may include information associated with Joe's Burger Joint.

Although user interface 800 of FIG. 8 depicts a variety of information, in other implementations, user interface 800 may depict less information, different information, differently arranged information, and/or additional information than depicted in FIG. 8. In one example implementation, microphone 230 (FIG. 2) may be utilized by the user of user device 110 to provide voice commands to the location-based proximity notification application. The voice commands may be used in place of and/or in addition to the user inputs described above in connection with FIG. 8.

Figure 9:
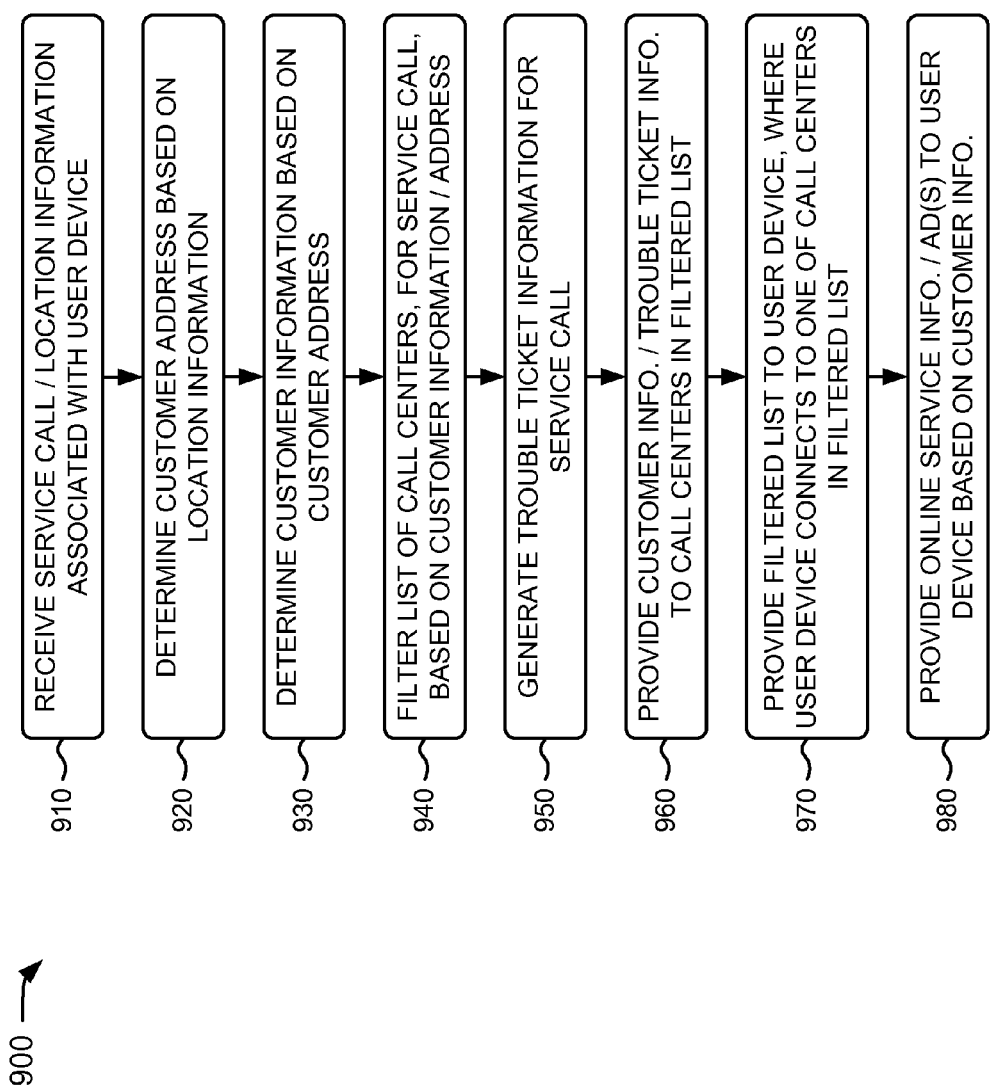
FIGS. 9 and 10 are flow charts of an example process for providing location-based call center filtering according to an implementation described herein.
Figure 10:
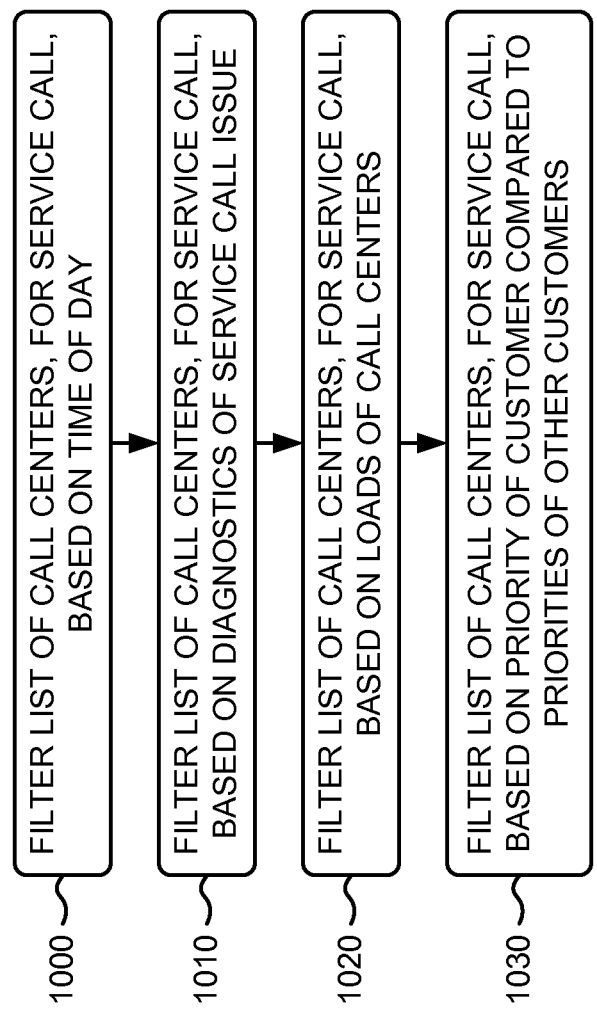

FIGS. 9 and 10 are flow charts of an example process 900 for providing location-based call center filtering according to an implementation described herein. In one implementation, process 900 may be performed by server 120. Alternatively, or additionally, some or all of process 900 may be performed by another device or group of devices, including or excluding server 120.

As shown in FIG. 9, process 900 may include receiving a service call and location information associated with a user device (block 910), and determining a customer address based on the location information (block 920). For example, in an implementation described above in connection with FIG. 5, a customer of user device 110 may access mobile application 115 via selection of a mechanism (e.g., an icon, a link, a button, a menu item, etc.) associated with mobile application 115. When the customer accesses mobile application 115, mobile application 115 may cause user device 110 to provide service call 510, or a request for a service call, to server 120, and may cause user device 110 to provide GPS coordinates 520 (e.g., generated by monitoring device 350, FIG. 3) of user device 110 to server 120. Server 120 may receive service call 510 and GPS coordinates 520.

As further shown in FIG. 9, process 900 may include determining customer information based on the customer address (block 930), and filtering a list of call centers, for the service call, based on the customer information and the customer address (block 940). For example, in an implementation described above in connection with FIG. 5, server 120 may identify the customer based on the determined address, and may retrieve customer services information 540 based on the identified customer. Customer services information 540 may include information associated with services and/or products subscribed to by the customer, such as, for example, information associated with a wireless calling plan, television service plan, an Internet service plan, etc. subscribed to by the customer. Server 120 may filter call center information 530 to obtain a filtered list of call centers 130, for service call 510, based on the determined address and customer services information 540. In one example, server 120 may filter call center information 530 to a list of call centers 130 that the customer is likely to call based on the determined address and the services and/or products subscribed to by the customer.

Returning to FIG. 9, process 900 may include generating trouble ticket information for the service call (block 950), and providing the customer information and the trouble ticket information to call centers in the filtered list (block 960). For example, in an implementation described above in connection with FIG. 5, server 120 may retrieve any old trouble ticket(s) 550 for prior service calls associated with the customer. Server 120 may also generate new trouble ticket 560 for service call 510. Server 120 may provide customer services information 540, old trouble ticket(s) 550, and new trouble ticket 560 to call centers 130 identified by the filtered list of call centers 130. In one example, server 120 may provide customer services information 540, old trouble ticket(s) 550, and new trouble ticket 560 to call center 130-1.

As further shown in FIG. 9, process 900 may include providing the filtered list to the user device, where the user device connects to one of the call centers in the filtered list (block 970), and providing online service information and/or advertisements to the user device based on the customer information (block 980). For example, in an implementation described above in connection with FIG. 5, server 120 may provide list 570 of call centers 130 and online/other information 580 to user device 110. List 570 may include the filtered list of call centers 130 and the telephones numbers associated with call centers 130 identified in the filtered list. User device 110, via mobile application 115, may display the filtered list of call centers 130 to the customer, and may enable the customer to select and call (e.g., via a one click mechanism) one of call centers 130 provided in the filtered list. Online/other information 580 may include information associated with online help accessible to the customer, information associated with advertisements customized to the customer, etc.

Process block 940 may include the process blocks depicted in FIG. 10. As shown in FIG. 10, process block 940 may include filtering the list of call centers, for the service call, based on a time of day (block 1000), filtering the list of call centers, for the service call, based on diagnostics of a service call issue (block 1010), filtering the list of call centers, for the service call, based on loads on the call centers (block 1020), and/or filtering the list of call centers, for the service call, based on a priority of the customer compared to priorities of other customers (block 1030). For example, in an implementation described above in connection with FIG. 7, location based filter 700 of server 120 may filter call center information 530 to obtain filtered list 750 of call centers 130, for service call 510, based on GPS coordinates 520. Time based filter 710 of server 120 may further filter list 750 of call centers 130, to create further filtered list 760, based on a time of day associated with service call 510. Diagnostic based filter 720 of server 120 may further filter list 760 of call centers 130, to create further filtered list 770, based on diagnostic results associated with service call 510. Load based filter 730 of server 120 may further filter list 770 of call centers 130, to create further filtered list 780, based on loads associated with call centers 130. Priority based filter 740 of server 120 may further filter list 780 of call centers 130, to create list 570, based on a priority (e.g., standard account, premium account, etc.) associated with the customer.

Systems and/or methods described herein may enable a user to retrieve, via a user device, a filtered list of call centers for a service call. The systems and/or methods may utilize GPS coordinates of the user device to determine a location of the user device, and may utilize the location of the user device to identify the user. The systems and/or methods may identify products and/or services subscribed to by the user, and may determine the filtered list of call centers that the user is likely to call based on the location and the products and/or services.

The foregoing description of implementations provides illustration and description, but is not intended to be exhaustive or to limit the implementations to the precise form disclosed. Modifications and variations are possible in light of the above teachings or may be acquired from practice of the implementations.

For example, while series of blocks have been described with regard to FIGS. 9 and 10, the order of the blocks may be modified in other implementations. Further, non-dependent blocks may be performed in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method, comprising:
   receiving, by a device, a request for a service call and location information associated with a user device;
   determining, by the device, an address of a customer, associated with the user device, based on the location information;
   determining, by the device, customer information based on the address;
   filtering, by the device, a list of call centers, for the service call, based on the customer information and the address;
   generating, by the device, trouble ticket information for the service call;
   providing, by the device, the customer information and the trouble ticket information to call centers provided in the filtered list of call centers;
   providing, by the device, the filtered list of call centers to the user device; and
   providing, by the device and to the user device, online service information based on the customer information.

2. The method of claim 1, further comprising:
   providing, to the user device, advertisements based on the customer information.

3. The method of claim 1, where the user device connects to one of the call centers provided in the filtered list of call centers.

4. The method of claim 1, where the location information includes global positioning system (GPS) coordinates that identify a current location of the user device.

5. The method of claim 1, where the location information includes information identifying a location other than a current location of the user device.

6. The method of claim 1, where the customer information includes information identifying one or more of:
   one or more services associated with the customer, or
   one or more products associated with the customer.

7. The method of claim 1, where the trouble ticket information includes:
   one or more trouble tickets previously generated for the customer, and
   a new trouble ticket generated for the service call.

8. The method of claim 1, further comprising at least one of:
   filtering the list of call centers based on a time of day associated with the service call;
   filtering the list of call centers based on diagnostics associated with the service call;
   filtering the list of call centers based on loads on the call centers; or
   filtering the list of call centers based on a priority of the customer compared to priorities of other customers.

9. A device, comprising:
   a memory; and
   a processor to:
   receive a request for a service call and location information associated with a user device, determine an address of a customer, associated with the user device, based on the location information, determine customer information based on the address, filter a list of call centers, for the service call, based on the customer information and the address, generate trouble ticket information for the service call, provide the customer information and the trouble ticket information to call centers provided in the filtered list of call centers, provide the filtered list of call centers to the user device, and provide, to the user device, online service information based on the customer information.

10. The device of claim 9, where the user device connects to one of the call centers provided in the filtered list of call centers.

11. The device of claim 9, where the location information includes one of:

global positioning system (GPS) coordinates that identify a current location of the user device, or information identifying a location other than the current location of the user device.

12. The device of claim 9, where the customer information includes information identifying one or more of:

one or more services associated with the customer, or one or more products associated with the customer.

13. The device of claim 9, where the trouble ticket information includes at least one of:

one or more trouble tickets previously generated for the customer, or a new trouble ticket generated for the service call.

14. The device of claim 9, where the processor is further to at least one of:

filter the list of call centers based on a time of day associated with the service call, filter the list of call centers based on diagnostics associated with the service call, filter the list of call centers based on loads on the call centers, or filter the list of call centers based on a priority of the customer compared to priorities of other customers.

15. A non-transitory computer-readable medium storing instructions, the instructions comprising:

one or more instructions that, when executed by a processor of a device, cause the processor to:

receive a request for a service call and location information associated with a user device, determine customer information of a customer, associated with the user device, based on the location information, filter a list of call centers, for the service call, based on the customer information, generate trouble ticket information for the service call, provide the customer information and the trouble ticket information to call centers provided in the filtered list of call centers, provide the filtered list of call centers to the user device, and provide, to the user device, online service information based on the customer information.

16. The non-transitory computer-readable medium of claim 15, where the service call is routed to a call center, provided in the filtered list of call centers, that is selected by the customer.

17. The non-transitory computer-readable medium of claim 15, where the location information includes global positioning system (GPS) coordinates that identify a current location of the user device.

18. The non-transitory computer-readable medium of claim 15, where the location information includes information identifying a location other than a current location of the user device.

19. The non-transitory computer-readable medium of claim 15, where the customer information includes information identifying services or products subscribed to by the customer.

20. The non-transitory computer-readable medium of claim 15, where the trouble ticket information includes:

one or more trouble tickets previously generated for the customer, and a new trouble ticket generated for the service call.

21. The non-transitory computer-readable medium of claim 15, further comprising:

one or more instructions that, when executed by the processor of the device, cause the processor to at least one of:

filter the list of call centers based on a time of day associated with the service call, filter the list of call centers based on diagnostics associated with the service call, filter the list of call centers based on loads on the call centers, or filter the list of call centers based on a priority of the customer compared to priorities of other customers.

* * * * *